(12) United States Patent
Aue

(10) Patent No.: US 6,580,750 B2
(45) Date of Patent: Jun. 17, 2003

(54) PROCESS FOR RECEIVING SPREAD-SPECTRUM SIGNALS

(75) Inventor: Volker Aue, Dresden (DE)

(73) Assignee: Systemonic AG (DE)

( * ) Notice: Subject to any disclaimer, the term of this patent is extended or adjusted under 35 U.S.C. 154(b) by 0 days.

(21) Appl. No.: 09/826,800

(22) Filed: Apr. 5, 2001

(65) Prior Publication Data

US 2002/0051486 A1 May 2, 2002

Related U.S. Application Data

(63) Continuation of application No. PCT/DE99/03202, filed on Oct. 5, 1999.

(51) Int. Cl.[7] ................................................ H04B 1/69
(52) U.S. Cl. ..................................................... 375/150
(58) Field of Search ................................ 375/130, 134, 375/136, 140, 142, 147, 148, 150, 267, 299, 349; 370/320, 335, 342, 441; 455/132.561, 137, 152.1, 242.2, 500

(56) References Cited

U.S. PATENT DOCUMENTS

| | | | | |
|---|---|---|---|---|
| 5,541,963 A | * | 7/1996 | Nakagoshi | 375/347 |
| 5,809,064 A | | 9/1998 | Fenton et al. | 375/208 |
| 5,809,089 A | * | 9/1998 | Vasic | 375/341 |
| 5,926,500 A | * | 7/1999 | Odenwalder | 375/200 |
| 6,122,311 A | * | 9/2000 | Watanabe et al. | 375/147 |
| 6,192,066 B1 | * | 2/2001 | Asanuma | 375/130 |
| 6,285,861 B1 | * | 9/2001 | Bonaccorso et al. | 455/137 |
| 6,330,271 B1 | * | 12/2001 | Klang et al. | 375/134 |
| 6,345,078 B1 | * | 2/2002 | Basso | 375/349 |
| 6,363,104 B1 | * | 3/2002 | Bottomley | 375/148 |
| 6,370,397 B1 | * | 4/2002 | Popovic et al. | 455/561 |

FOREIGN PATENT DOCUMENTS

| | | |
|---|---|---|
| DE | 3743731 | 7/1989 |
| WO | 9706446 | 2/1997 |
| WO | 9728608 | 8/1997 |

OTHER PUBLICATIONS

R. Price et al., "A Communication Technique for Multipath Channels", Proceedings of the IRE, pp555–570.
R. Pickholtz et al., "Theory of Spread–Spectrum Communications—A Tutorial", IEEE Transactions on Communication, vol. Com–30, No. 5, May 1982, pp. 855–884.
Theodore S. Rappaport, "Modulaton Techniques for Mobile Radio", Wireless Communications Principles and Practice, Chapter 5, Prentice Hall PTR, pp. 274–284, 1996.
Latva–aho, "Quasi–Coherent Delay–Locked Loops for Fading Channels", pp. 455–459, 1996 IEEE.
A. Goiser, "Spread–Spectrum Technik", pp. 10–26, 1998.

* cited by examiner

*Primary Examiner*—Emmanuel Bayard
(74) *Attorney, Agent, or Firm*—Baker Botts LLP

(57) ABSTRACT

The invention relates to a method for receiving spread-spectrum signals for fine time synchronization of correlators in a RAKE receiver. The objective of the invention is to produce a signal that is to be transmitted with the highest possible signal to noise ratio on the basis of the received signal. To achieve this, a higher level unit intervenes in the normal adjustment of a first basic time lag in a first RAKE finger and the normal adjustment of a second basic time lag in a second RAKE finger when the difference between the basic time lags of both RAKE fingers corresponds to a minimum level, and subsequently carries out a joint adjustment for both RAKE fingers, taking time error estimates for both RAKE fingers into account.

3 Claims, 8 Drawing Sheets

Fig. 2

| i | a) | | | b) | | | c) | | |
|---|---|---|---|---|---|---|---|---|---|
| | $\tau_i/T_c$ | Re{$\xi_i$} | Im{$\xi_i$} | $\tau_i/T_c$ | Re{$\xi_i$} | Im{$\xi_i$} | $\tau_i/T_c$ | Re{$\xi_i$} | Im{$\xi_i$} |
| 1 | 0.0 | 0.834 | 0.000 | 0.0 | 0.834 | 0.000 | 0.0 | 0.834 | 0.000 |
| 2 | 3.6 | 0.731 | 0.012 | 1.2 | 0.731 | 0.012 | 1.2 | -0.731 | 0.012 |
| 3 | 8.1 | 0.346 | -0.122 | 2.7 | 0.346 | -0.122 | 2.7 | 0.346 | -0.122 |

PROCESS FOR RECEIVING SPREAD-SPECTRUM SIGNALS

This is a continuation of application No. PCT/DE99/03202, filed Oct. 5, 1999.

BACKGROUND OF THE INVENTION

The invention relates to a process for receiving spread spectrum signals in which a receiving signal is received from a sending signal, which is encoded with a spread code, and is filtered. After this, in a first process part in a first RAKE finger, the filtered receiving signal, in an on-time correlation, is multiplied by a conjugated complex spread code, which is delayed by a base time delay in relation to the spread code of the sending signal, and the result is summed in a first adder. The result of the first summation is output as an information signal and the adder is reset. The filtered receiving signal is further processed in two alternative processes. In the first process, in a late correlation, the filtered receiving signal is multiplied by the conjugated complex spread code of the sending signal, which is delayed in relation to the spread code (c (t)) of the sending signal by a first base time delay and a positive additional time delay that increases the first base time delay, and is summed in a second adder. In an early correlation, the filtered receiving signal is multiplied by the conjugated complex spread code, which is delayed in relation to the spread code (c (t)) of the sending signal by the first base time delay and a negative additional time delay that decreases the first base time delay, and is then summed in a third adder. Then a correlation difference signal is determined as the difference between the results of the early and late correlations and the second and third adders are reset.

In the second process, the filtered receiving signal is multiplied by the difference between the conjugated complex spread code, which is delayed in relation to the spread code of the sending signal by the first base time delay and the positive additional time delay that increases the first base time delay, and the conjugated complex spread code, which is delayed in relation to the spread code of the sending signal by the first base time delay and the negative additional time delay that decreases the first base time delay, and the multiplied signal is summed in a fourth adder. This produces the correlation difference signal. After it is processed further, the fourth adder is reset. Then the real component of the difference signal, which is determined in the one or the other process, and the information signal is established as an error signal and used to control the magnitude of the base time delay.

Parallel to the above processing in a second RAKE finger, the same process steps are executed with a second base time delay which has a difference in relation to the first base time delay, and the information signals of the parallel executed processed parts are combined.

The invention also relates to a method which has the same sequence; but wherein, the receiving signal is not filtered but is instead multiplied by a filtered conjugated complex spread code, and the product signals are integrated, which achieves the correlation.

The process according to the invention uses RAKE receivers of the kind described in R. Price, P. E. Green, Jr., [In English:] "A Communication Technique for Multipath Channels," Proc. IRE, Vol. 46, March 1958, pp. 555–570. The RAKE receiver is a receiver apparatus which is outstandingly suited for receiving spread spectrum signals and is used for this. The conventional RAKE receiver is comprised of a number of correlators which despread the spread spectrum signal with a different time offset and recover the narrowband signal.

Spread spectrum techniques of the type mentioned the beginning, as are described in R. L. Pickholtz, D. L. Schilling, L. B. Milstein, [In English:] "Theory of Spread Spectrum Communications—a Tutorial," IEEE Transactions on Communications, Vol. COM-30, May 1982, pp. 855–884 and in M. J. Goiser Alois, *Handbuch der Spread-Spectrum*—Technik [Handbook of Spread Spectrum Engineering], Springer, 1998, have been used in the past exclusively for military applications for encoding and masking signals and for increasing jamming resistance. In this connection, a narrowband signal to be transmitted is multiplied through multiplication with a broadband pseudo-random spread sequence. The elements of the random sequence are referred to as chips. The resulting signal is likewise in broadband format. In other words, the signal to be sent, i.e. the sending signal, is encoded with a spread code.

In the receiver, this sending signal is received and then processed further as a receiving signal. After a time which is defined by the sending signal, the same broadband pseudo-random spread sequence is used in the receiver as is used for encoding the transmitted signal. This is possible because of the character of the pseudo-randomness, as a result of which the same pseudo-random sequence can be produced using the same technical means and assumptions. The sender and the receiver only need to know the means and assumptions for producing the pseudo-random sequence.

The original narrowband signal is then recovered in the receiver through multiplication by the conjugated complex spread.

In cellular mobile telephony, where a limited bandwidth must be made available to numerous subscribers, this process is likewise attractive. In this instance, different subscribers are simply associated with different pseudo-random spread sequences. For the receiver which uses the spread code of the desired subscriber to be detected, the signals of all the other subscribers behave like noise.

The information to be transmitted can be recovered in the receiver as long as the overall power of the interfering signals is compatible.

For a few years, spread spectrum has been used successfully in the American mobile telephone standard "IS-95." Direct sequence spread spectrum has been proposed as the basic process for the mobile telephone standard of the third generation "IMT-2000" and it is probable that the mobile telephone standard of the third generation will be based on this process because it permits a simple and flexible allocation of the spectrum to different subscribers with different bandwidth requirements.

In mobile telephony, the transmitted signal of a base station usually does not travel directly to the receiver but instead arrives by a circuitous route through multiple reflections. The received signal is distinguished by an overlapping of these multiple reflections, which differ only in value, phase, and the transit time delay corresponding to the propagation path. Each signal component that has reached the receiver via reflections is in turn comprised of a series of separate signals with slight transit time differences so that the signal component that has reached the receiver via a particular path is subject to rapid fading.

Because of the favorable correlation properties of the spread spectrum signals, specific individual paths (signal components) of a multipath signal can be detected with a RAKE receiver through correlation with correspondingly delayed pseudo-random spread sequences. A combination of the correlation results permits a more reliable reconstruction of the information of the sending signal than when only a single correlation result is used.

Conventional processes use a time error estimator for each correlator of a RAKE receiver, which estimator, through a first correlation with an additional positive time offset and through a second correlation with a negative additional time offset, estimates the time delay in relation to the optimal time offset for the local random code generator, for which the actual correlator extracts the maximal signal strength from the multipath signal component. The correlator and time error estimator are often combined into one overarching unit which can also contain other estimators and which is referred to as a RAKE finger. The above-described process for time error estimation is therefore referred to as the early-late process. The estimated time delay is used by the RAKE finger itself or by an additional overarching unit for time tracking, for the so-called fine time synchronization.

Conventional, useful implementations of the early-late time error estimator function successfully with only one additional correlator for time error estimation. The receiving signal is first band limited by a receiving filter. The receiving filter is a root Nyquist filter which is adapted to the sending pulse of the broadband spread signal.

After scanning with the chip rate, only one summation of the products of the scanned values with the corresponding elements of the conjugated complex spread sequence is required for correlation and despreading.

The result of the adder is read out every N values and the adder is reset, wherein N represents the number of values allotted to a data symbol. The value thus obtained for each sum of N values is the estimated value of the information signal for the RAKE finger.

For the early-late process, in parallel to this correlation with an offset, a correlation is executed with the difference between the conjugated complex spread code that is delayed by a half-chip duration and the conjugated complex spread code that leads by half a chip duration. The real component of the product of this correlation result and the conjugated complex correlation result for the estimate value of the RAKE finger supplies the error signal that can be used for the fine time synchronization of the RAKE finger.

As a rule, the fine synchronization is achieved by virtue of the fact that the error signal is transmitted through a narrowband loop filter and the filtered signal controls the local spread code generator.

In the known process for fine time synchronization, it is disadvantageous that the early-late processes used for time error estimation are in fact optimal for channels with only one path, but are very interference-prone with multipath signals which differ by only a slight time offset (slight in comparison to the clock speed of the random sequence), i.e. when the differences of the circuitous transit times can no longer be solved due to the band limitation of the signals. On the one hand, the sluggishness of the control loops involved in the fine synchronization is designed for the changeability of the relative time offsets of multipath signals, but it is not designed for the changeability of the rapid fading caused by movement so that with faster movement, it is not possible to track the optimal time offset. On the other hand, there is the possibility that with independent regulation, due to the multipath profile, chronologically adjacent RAKE fingers have the same time offset. This is undesirable to the extent that in this instance, no additional information is obtained from the receiving signal. When there is a relative time offset of fewer than one cycle duration of the random sequence, then it can be assumed that the output data of the RAKE fingers are correlated. In known processes, therefore, one of two chronologically adjacent RAKE fingers is switched off when a previously determined minimal time difference between the RAKE fingers has not been met due to the individual fine synchronization. In certain cases, additional information would be easily obtainable from another RAKE finger with the permitted minimal time offset.

The object of the invention, therefore, is to disclose a process for receiving spread spectrum signals with which the signal to be transmitted can be generated from the receiving signal with the greatest possible signal-to-noise ratio.

SUMMARY OF THE INVENTION

According to the invention, this object is attained by virtue of the fact that at the beginning of the process, the amount of the difference between first and second base time delays in RAKE fingers is greater than a minimum difference and that when the minimum difference is reached during the course of the process, the error signals of the first process part and the second process part are combined. This combined error signal is used as a new error signal for controlling the base delay in both process parts.

The advantage of the method according to the invention is comprised in that with channels in which the transit time differences of the multipath paths approximately correspond to the chip duration, or are less than it, i.e. can no longer be resolved by the receiver, still more RAKE fingers can be used in order to obtain more information from the receiving signal about the sending signal than is possible with conventional processes. This means that the information contained in the multipath signal components can still be effectively used even if a precise determination of the paths is no longer possible due to the transit time differences. The average synchronization error turns out to be lower for the apparatus according to the invention.

The variance of the time offset for one group of RAKE fingers with unresolvable multipath signals is lower with the fine synchronization process according to the invention than is the case with a single RAKE finger.

The process finds the time offset for the group of RAKE fingers for which the maximal ratio combining (MRC), as a process for combining the correlation results of the RAKE fingers, provides the maximal signal-to-noise ratio. MRC is the process that provides the maximal signal-to-noise ratio when combining input signals with uncorrelated noise.

The process is non-coherent, i.e. information about the carrier phase is not required for fine synchronization. As a result, the process is not assigned to additional channel estimation processes whose function does not always have to be assured in multipath fading channels. The process is equally suited for coherent and non-coherent transmission processes.

The process is based on a non-coherent process for finding the optimal time offset of a correlator in the absence of multipath propagation, which correlator functions successfully with only one additional correlator (FIG. 1). Furthermore, correlation is carried out with the difference code which in the direct sequence spread spectrum is comprised on average of 50 percent zeros, which permits an implementation in which the power consumption is reduced by up to 50 percent.

A favorable embodiment of the process according to the invention provides that the minimum difference corresponds to one chip duration.

As a result, the noise of information signals is uncorrelated in both process parts.

Another embodiment of the process according to the invention provides that when an originally large difference between the first and second base time delays is reduced to the minimum difference during the course of the process, the first and second RAKE fingers are grouped. From then on, the process steps are executed jointly for the group.

In this connection, it is possible to improve the process according to the invention by virtue of the fact that a RAKE finger is removed from the group when, during the course of the process steps, the difference between the first and second base time delays would change to a value greater than the minimum difference with separate error signals.

It is also possible that from the beginning of the process progression onward, a group is initiated independent of the difference between the first and second base time delays.

As a result, data from neighboring multipath paths can be used from the start.

In this connection, it is to be expected that the grouping reduces the variance of the regulating signal markedly, which can be explained based on the improved utilization of the multipath channel by the apparatus. To this end, another embodiment of the process provides that the first RAKE finger has a second RAKE finger added to it, whose base delay differs from that of the first RAKE finger by the minimum interval, as a result of which the first and second RAKE fingers constitute a group, or a third RAKE finger with a minimum interval is added to a group of RAKE fingers, as a result of which the number of RAKE fingers in a group is increased.

It is probable that neighboring multipath paths are not always recognized by the acquisition unit and initially, only a single RAKE finger is used for the detection of these paths. Due to the changeability of the channel produced by the rapid fading, in this instance, an increased variance of the time error signal or the time offset of the RAKE finger must be expected. Through an observation (measurement) of this variance, it is possible to detect closely adjacent multipath propagation. As a result, an additional RAKE finger can be assigned to the first one, whose base delay differs from the first one by the minimum interval, as a result of which the two RAKE fingers constitute a group and the desired result is achieved.

The invention will be explained in detail below in conjunction with two exemplary embodiments.

BRIEF DESCRIPTION OF THE DRAWINGS

FIG. 2 shows a tabular overview of the relative path delays and channel coefficients used in the example of the prior art.

DESCRIPTION OF THE INVENTION

Figure 1A:
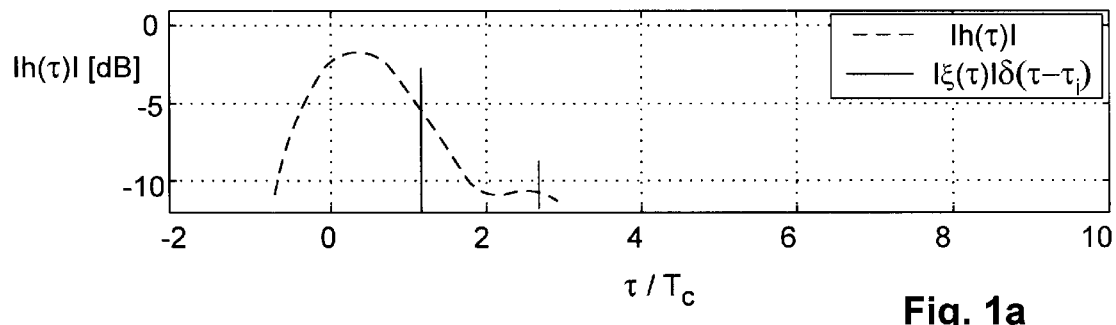
FIG. 1a shows an example of a pulse response with a resolvable multipath profile according to the prior art.

Before the description of the exemplary embodiments, the process according to the prior art will be explained in detail by way of example in conjunction with a system model:

$$s(t)=Re\{v(t)e^{j\omega_c t+\phi_c}\} \quad (1)$$

The sending signal is s(t)
wherein c is the carrier frequency, c is a phase shift, and v(t) is the complex base band signal to be sent.

$$v(t) = \sqrt{2P} \sum_{n=-\infty}^{\infty} c_n g_c(t-nT_c) \quad (2)$$

$c_n$, are the chips and $|c|=1 \cdot g_c(t)$ is the pulse response of a root Nyquist pulse forming filter (e.g. of a root cosine filter) with autocorrelation function $$R_c(\tau) = \int_{-\infty}^{\infty} g_c^*(t) g_c(t+\tau) dt \quad (3)$$

The noise $\tilde{n}(t)$, which is present in the receiver, is described by the equation $$\tilde{n}(t)=[\tilde{n}_I(t)\cos(\omega_c t)-\tilde{n}_Q(t)\sin(\omega_c t)] \quad (4)$$

wherein $\tilde{n}_I(t)$ and $\tilde{n}_Q(t)$ are two independent average-free Gauss processes with one-sided power spectral density $N_0$ W/Hz. It is assumed that the signal present in the receiver is conveyed through the receiving filter and is mixed into the base band.

The receiving filter is a filter which is adapted to the pulse form of a chip, with $g_c(-t)$ as a pulse response. In addition, let $\xi(\tau)$ be the channel pulse response of a channel that is stationary in the broad sense, with uncorrelated interferences (WSSUS), $$\xi(\tau) = \sum_{i=1}^{P} \xi_i \delta(\tau - \tau_i) \quad (5)$$

$h(\tau)$ defines the total pulse response, with the inclusion of the sending and receiving filters, i.e., $$h(\tau) = \sum_{i=1}^{P} \xi_i R_c(\tau - \tau_i) \quad (6)$$

The received signal, which is conveyed through the chip-matched filter, is $$r(t) = \sqrt{2P} \sum_{n=-\infty}^{\infty} \sum_{i=1}^{p} c_n R_c(t - nT_c - \tau_i) e^{j\phi_c} + n(t) \quad (7)$$

wherein $$n(t) = n_I(t) + j n_Q(t) \quad (8)$$

$n_I(t)$ and $n_Q(t)$ are two independent average-free Gauss processes with dual-sided power spectral density $N_0/2\ G(f)$ and autocorrelation function $N_0/T_c R_c(\tau)$.

FIG. 1a depicts an example for a pulse response which is comprised of three paths. The corresponding channel pulse response $h(\tau)$ is likewise represented, wherein a root cosine filter with a 22% roll off factor was used as the sending and receiving filter.

The delays and complex channel coefficients $\xi_i$ are listed in FIG. 2. It is clear that an early-late process for fine synchronization with an offset of $\Delta \leq T_c$ can be used in order to track the delays $\tau_i$. Most early-late synchronization processes use $\Delta = T_c/2$, half the chip time duration, but other values are also possible.

Figure 3:
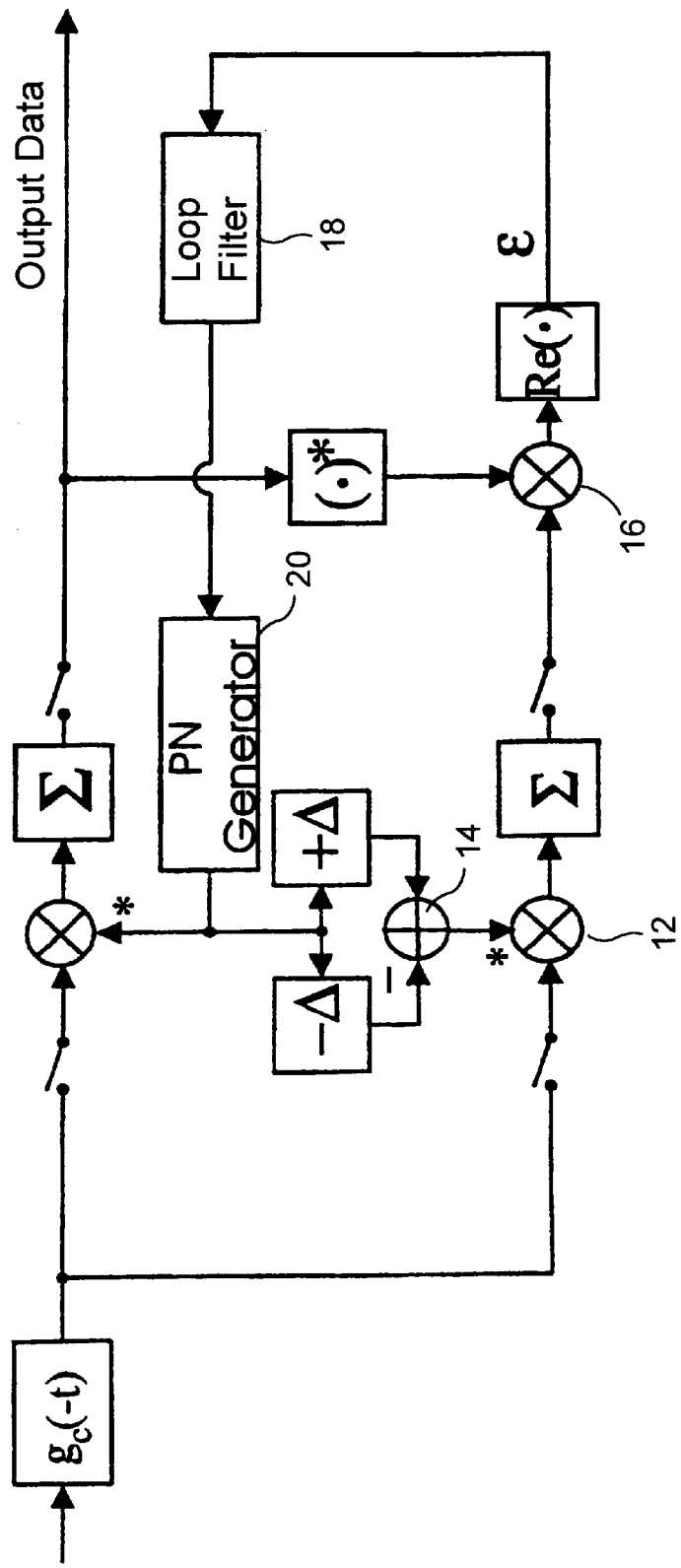
FIG. 3 shows an early-late fine synchronization process according to the prior art.

An early-late error estimator which requires only one additional correlator is shown in FIG. 3 and is often referred to as a dot product discriminator. The receiving signal in this instance is correlated in mixer 12 with the difference between the code that is delayed by $T_c/2$ and the code that leads by $T_c/2$ generated in adder 14. The dependence of the result from the channel phase is eliminated through subsequent multiplication by the conjugated complex correlation value of the non-delayed code in mixer 16. In the implementation shown in FIG. 3, the signal is first conveyed through a chip-matched filter called 18 a loop filter and is then scanned in the chip cycle. The real component of the product of the difference code and the non-delayed code correlation is the error signal, which is then conveyed through the so-called loop filter 18 and controls the phase of the code generator 28. In a flat channel, the structure of this early-late error estimator can be motivated by the problem of receiving power maximization at the output of the non-delayed code correlator. The output signal power $P_s$ of the non-delayed code correlator is $$P_s(\epsilon) = 2P|\xi|^2 N_{PG}^2 |R_c(-\epsilon)|^2 \quad (9)$$

wherein $N_{PG}$ is the spread factor. The required and sufficient condition for a maximal $P_s$ for $-T_c \ll T_c$ is $$\frac{d}{d\epsilon} P_s(\epsilon) = 0 \quad (10)$$

The derivation of $P_s$ according to is $$\frac{d}{d\epsilon} P_s(\epsilon) = -4PN_{PG}^2 |\xi|^2 R_c^*(-\epsilon) \frac{d}{d\epsilon} R_c(-\epsilon) \quad (11)$$

$$= -4PN_{PG}^2 |\xi|^2 R_c^*(-\epsilon) \lim_{\delta \to 0} \frac{R_c(-\epsilon + \delta) - R_c(-\epsilon - \delta)}{2\delta}$$

Figure 4:
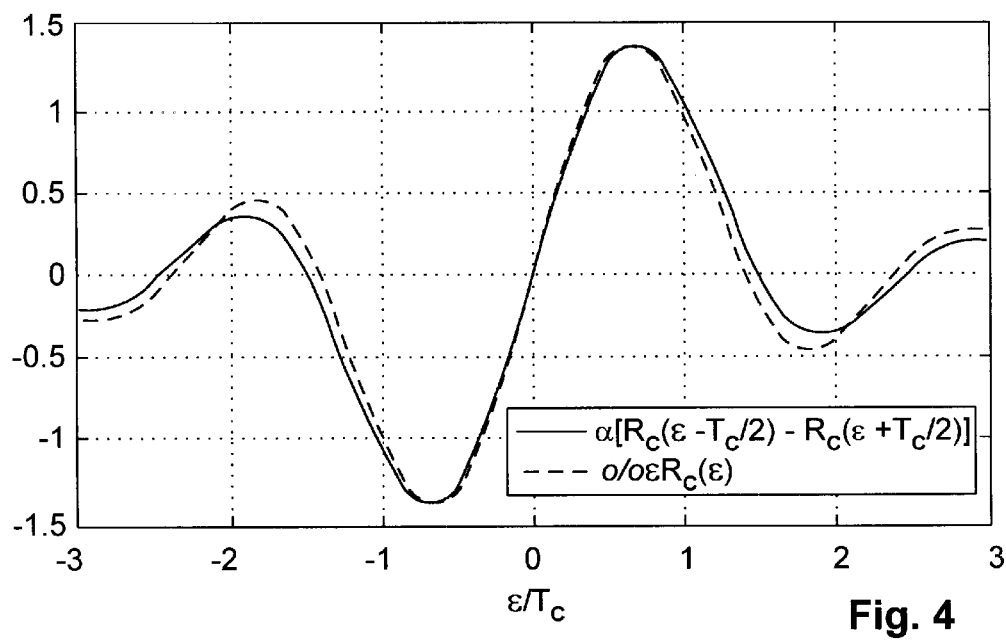
FIG. 4 shows a derivation and a convergence of a cosine pulse with 22% roll off according to the prior art.

The left part of equation (11) is the conjugated complex correlation signal of the non-delayed code. The limit value can be approximated by means of the difference quotient $$\lim_{\delta \to 0} \frac{R_c(-\epsilon + \delta) - R_c(-\epsilon - \delta)}{2\delta} \approx \frac{R_c(-\epsilon + \Delta) - R_c(-\epsilon - \Delta)}{2\Delta} \quad (12)$$

which can be obtained by means of correlation with the difference code. The derivation and the approximation with the aid of the difference quotient is shown by way of example in FIG. 4 for a cosine pulse with 22% roll off and $=T_c/2$.

For the transit time delays of the paths according to FIG. 1a, the noise of the correlator outputs can be assumed to be uncorrelated so that a multipath combination is possible in accordance with the principal of maximal ratio combining.

Figure 5:
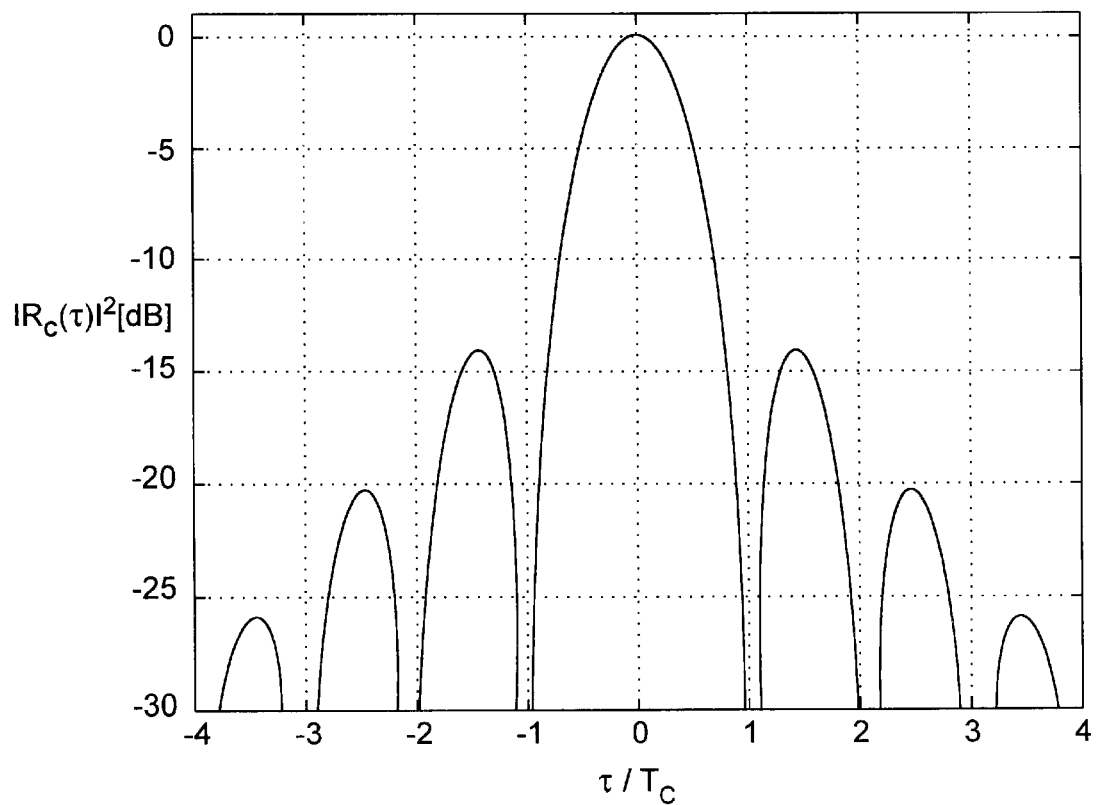
FIG. 5 shows the amplitude of a pulse response of a cosine pulse with 22% roll off according to the prior art

The value of the autocorrelation function $R_c(\tau)$ is shown in FIG. 5. For $|\tau| > 0.85 T_c$, the value of $R_c(\tau)$ is less than $-14$ dB, i.e. for the corresponding sending and receiving filter pair, after this delay, the noise can be assumed to be practically uncorrelated if for every $|\tau_i - \tau_j|\ 0.85 T_c$ with $i <> j$ and $I \leq i$, the equation $j < p$ is true. For $|\tau_i - \tau_j| = nT_c$, n integer, the noise is uncorrelated, since $R_c(nT_c) = 0$.

Figure 1B:
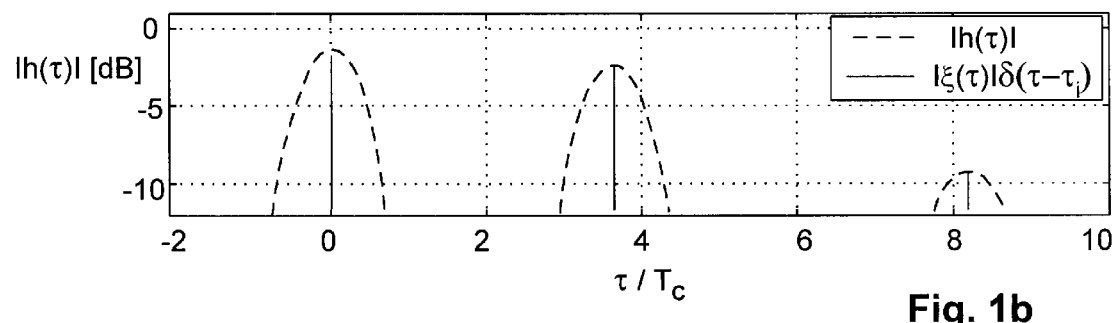
FIG. 1b shows an example of a pulse response with an unresolvable multipath profile according to the prior art.

A channel pulse response in which the multipath paths cannot be solved is shown in FIG. 1b, wherein the coefficients from FIG. 1a have been maintained. The relative time delays, however, have been compressed by a factor of three. If a number of RAKE fingers are initially allocated to this channel profile and the fine time synchronization is executed independently for each RAKE finger, then each RAKE finger finds the correlation maximum at 0.35 $T_c$ independently of the others. Clearly, for these short relative delays, the outputs of the RAKE fingers can no longer be regarded as independent. A decorrelation of the RAKE fingers through multiplication with the inverses of the correlation matrix is in fact possible, but involves a calculation expense that cannot be ignored.

In addition, the correlation matrix is conditioned worse for smaller relative time offset between the RAKE fingers. A poorly conditioned matrix can lead to stability problems and to a reduced performance of the receiver. In conventional receivers, a control loop therefore combines RAKE fingers when the time difference between the fingers is less than a previously determined minimal interval. As a rule, this occurs in such a way that the RAKE finger which receives the most signal power is retained and the RAKE finger which receives less signal power is removed from the process. This can then be reassociated with other multipath paths.

However, if only one RAKE finger is used to detect the signal from the pulse response according to FIG. 1b, the receiver inevitably loses signal power. Furthermore, the synchronization is impaired by the multipath propagation. Normally, the time changeability of the amplitude values and phases of the channel coefficients $\xi_i$ is considerably greater than is the case with the relative time delays $\tau_i$ of multipath paths.

If the individual multipath paths can no longer be chronologically resolved, then they contribute constructively or deconstructively to the total channel pulse response, which in turn results in a rapid time changeability of the position of the maxima of the channel pulse response.

Figure 1C:
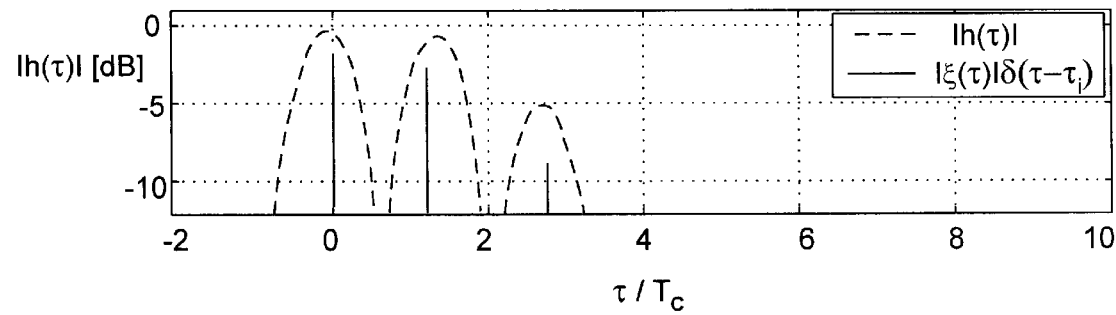
FIG. 1c shows an example for a pulse response that is equivalent to the one shown in FIG. 1b, with different phases.

In order to depict this behavior, the phase of the channel coefficient $\xi_2$ was rotated by 180° and the resulting channel pulse response is depicted in FIG. 1c. However, synchronization parameters such as the bandwidth of the control loop, etc., are matched to the time changeability of the relative delay of a particular path, but are not matched to the rapid fading. As a result, it is clear that in the case in which the double bandwidth exceeds the bandwidth of the control loop, a further reduction of the power of the receiver can be expected, due to the inability of the synchronization process to keep pace with the rapid changeability of the channel.

The process for fine synchronization according to the invention, as explained in both of the following exemplary embodiments, which are suited for unresolvable multipath propagation channels and can still utilize them, is comprised of a number of RAKE fingers which include a correlator for the correct-time estimate value $r_i$ and a time error estimator according to FIG. 3. As long as the interval of multipath paths is large in comparison to the chip duration, the fine time synchronization is carried out independently for each RAKE finger. However, if the interval of the multipath paths moves into the magnitude of the chip duration, or is smaller than this, then a group of RAKE fingers with the same time offset is associated with this interval, wherein the interval of the RAKE fingers is the minimal permitted interval in the RAKE receiver.

The fine synchronization is then carried out jointly for this group in order to find the optimal time adjustment of the pseudo-noise sequence while maintaining the time offset of the RAKE fingers. First, it is assumed that the minimal permitted interval is the chip duration $T_c$ for which the values $r_i$ are uncorrelated and therefore it is possible to use maximal ratio combining for multipath combining. In each instance, during fine synchronization, a control unit assures that the interval between RAKE fingers never falls below the minimal permissible interval. If an initially large interval between two RAKE fingers has been reduced to the minimal interval during the fine synchronization, then the RAKE fingers are grouped and from then on, the fine synchronization is carried out jointly for the group. In the following, it will be demonstrated that by using the early-late estimator from FIG. 3 in each RAKE finger, the total time error signal for a group of L RAKE fingers results simply from the sum of the individual time error signals from all the RAKE fingers in a group.

The $i^{th}$ complex channel coefficient $h_i$ of the $i^{th}$ RAKE finger is the scan value of $h(\gamma)$ at time $iT_c - \epsilon$, wherein $\epsilon$ represents the offset to be optimized. The following equation holds true:

$$h_i(-\epsilon) = h(iT_c - \epsilon) \quad (13)$$

Since the noise power can be assumed to be constant for each RAKE finger, the purpose of the fine synchronization unit is to find the offset which provides the maximal signal output power. The signal power $P_s(\ )$ after the multipath combining is directly proportional to the sum over the square of the channel coefficients, i.e.

$$P_s(\epsilon) = c \sum_{i=0}^{L-1} |h_i(-\epsilon)|^2 \quad (14)$$

where c is a constant. The necessary condition for $P_s(0)$ to be maximal is that the derivative of $P_s$ for the offset 0 is equal to zero. The derivation of (14) with regard to is $$\frac{d}{d\epsilon} P_s(\epsilon) = -c \sum_{i=1}^{L-1} h_i^*(-\epsilon) \frac{d}{d\epsilon} h_i(-\epsilon) \quad (15)$$

$$= -\sum_{i=1}^{L-1} h_i^*(-\epsilon) \lim_{\delta \to 0} \frac{h_i(-\epsilon + \delta) - h_i(-\epsilon - \delta)}{2\delta}$$

wherein the limit value can be approximated by means of the difference quotient $$\lim_{\delta \to 0} \frac{h_i(-\epsilon + \delta) - h_i(-\epsilon - \delta)}{2\delta} \approx \frac{h_i(-\epsilon + \Delta) - h_i(-\epsilon - \Delta)}{2\Delta} \quad (16)$$

Independent of this, (15) represents the sum of all error estimate values of the individual RAKE fingers. It can also be concluded that the sum of the error estimate values of each individual RAKE finger of a group comprised of L RAKE fingers represents the sought-after error signal for the fine synchronization of the group.

Figure 6:
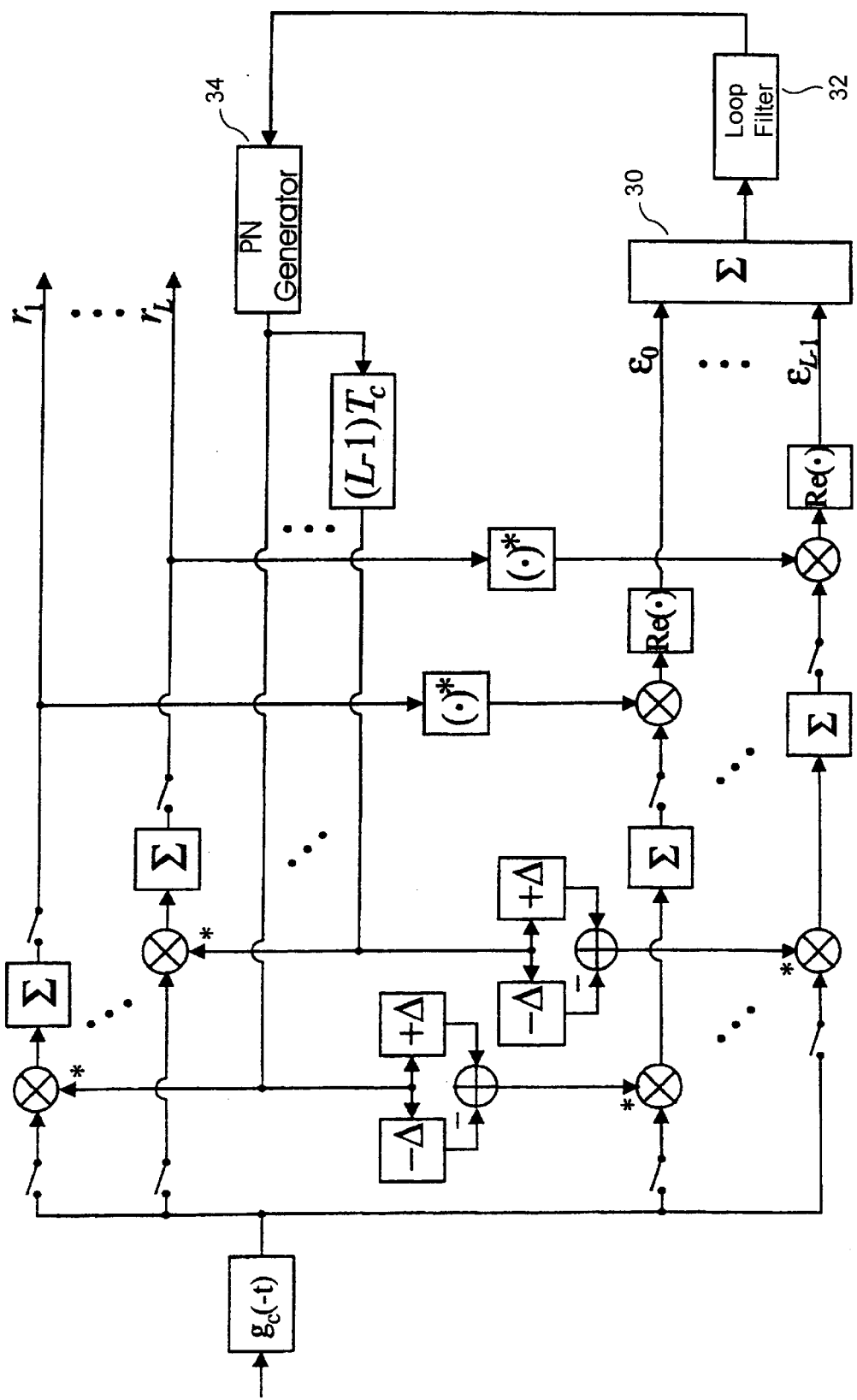
FIG. 6 is a block diagram of a basic implementation of a RAKE receiver according to one embodiment of the invention.

FIG. 6 shows the above-mentioned RAKE receiver for a group comprised of L RAKE fingers. The early-late offset is $2\Delta = T_c$. The combined error signal of the group from summary 30 is conveyed through the common loop filter 32 whose output signal controls the pseudo-noise generator 34 of the group.

Figure 7:
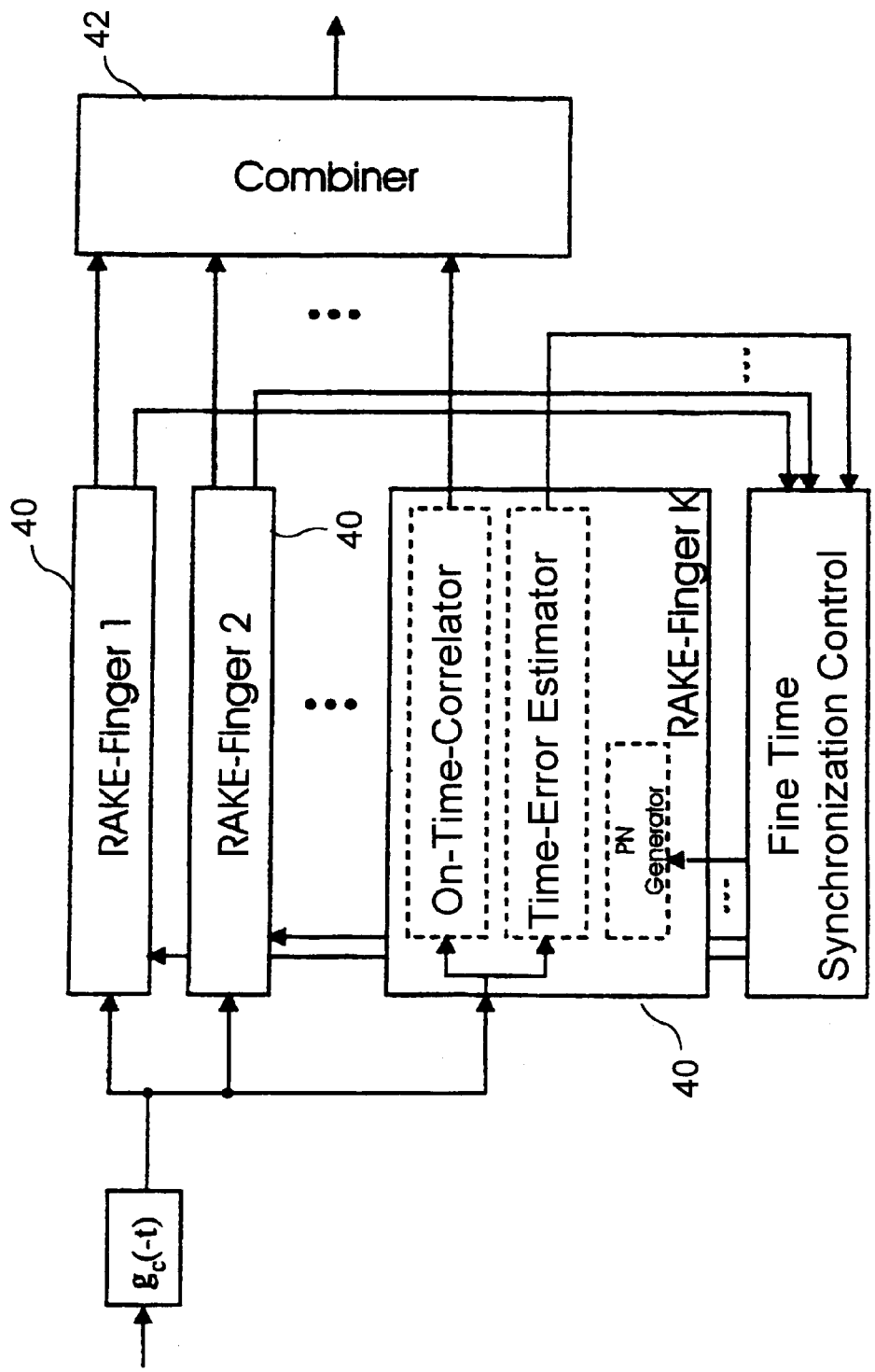
FIG. 7 is a basic block diagram of an embodiment of a base band implementation of a RAKE receiver according to the invention.

In the first exemplary embodiment, FIG. 7 shows the basic block diagram of the base band implementation of the RAKE receiver wherein the output of RAKE fingers 40 are combined in combiner 42.

It is assumed that the received signal has already been sufficiently amplified and converted into the base band with the aid of an IQ demodulator and exists in the form of a complex value base band signal. This signal is initially conveyed through the chip-matched filter, which is provided with K RAKE fingers. Each RAKE finger contains a correlator in which, with a certain base time offset (the time delay of the RAKE finger), a correlation is executed with the signal ("on time" correlation). This takes place by virtue of the fact that the signal with the desired time delay is initially scanned in the chip cycle. The scan values are then multiplied by the conjugated complex spread code (PN code) and the averages of the values corresponding to a narrowband data symbol are computed. The average values are the estimate values for the data symbol of the respective RAKE finger. The spread code generator of each RAKE finger has a different time delay from the input signal. The estimate values of a data symbol supplied independently of the RAKE fingers are then combined in the "combiner" using maximal ratio combining (MRC). In addition to the above described correlation value for obtaining the estimate value for the data symbol, each RAKE finger also supplies a time error estimate value or correlation difference signal. The time error estimate value is an estimate value for the difference between the optimal time offset and the current base time offset of the local PN generator of the RAKE finger to the input signal. In order to produce this correlation difference signal, a correlation is executed with the code leading the on-time correlation by a particular relative time delay $\Delta$ (early estimation) and another correlation with the code that is delayed by $\Delta$ (late estimation). In this connection, $2\Delta$ corresponds to the chip duration as a rule. However, other values are also possible.

The difference between the late and early estimation is then calculated. This correlation difference signal can also be obtained through a single correlation with a difference code comprised of the difference between the code that is delayed by and the code that leads by. Then the real component of the product of this result and the conjugated complex estimate value of the on-time correlation is calculated. The value thus obtained is the correlation difference signal for the corresponding data symbol and is taken from the RAKE finger as a time error signal. For the case in which the relative time delay of a RAKE finger under consideration differs from the time delays of the other RAKE fingers by more than a minimal time interval, this signal is used to control the time delay of the PN code of the RAKE finger in that it is conveyed through only one narrowband loop filter, merely to suppress noise influences.

The filter can also be disposed in the fine time synchronization unit (timing control). The filter must be designed so that the stability of the control loop is assured. The above-described apparatus for a RAKE finger is already shown in FIG. 3.

Figure 8:
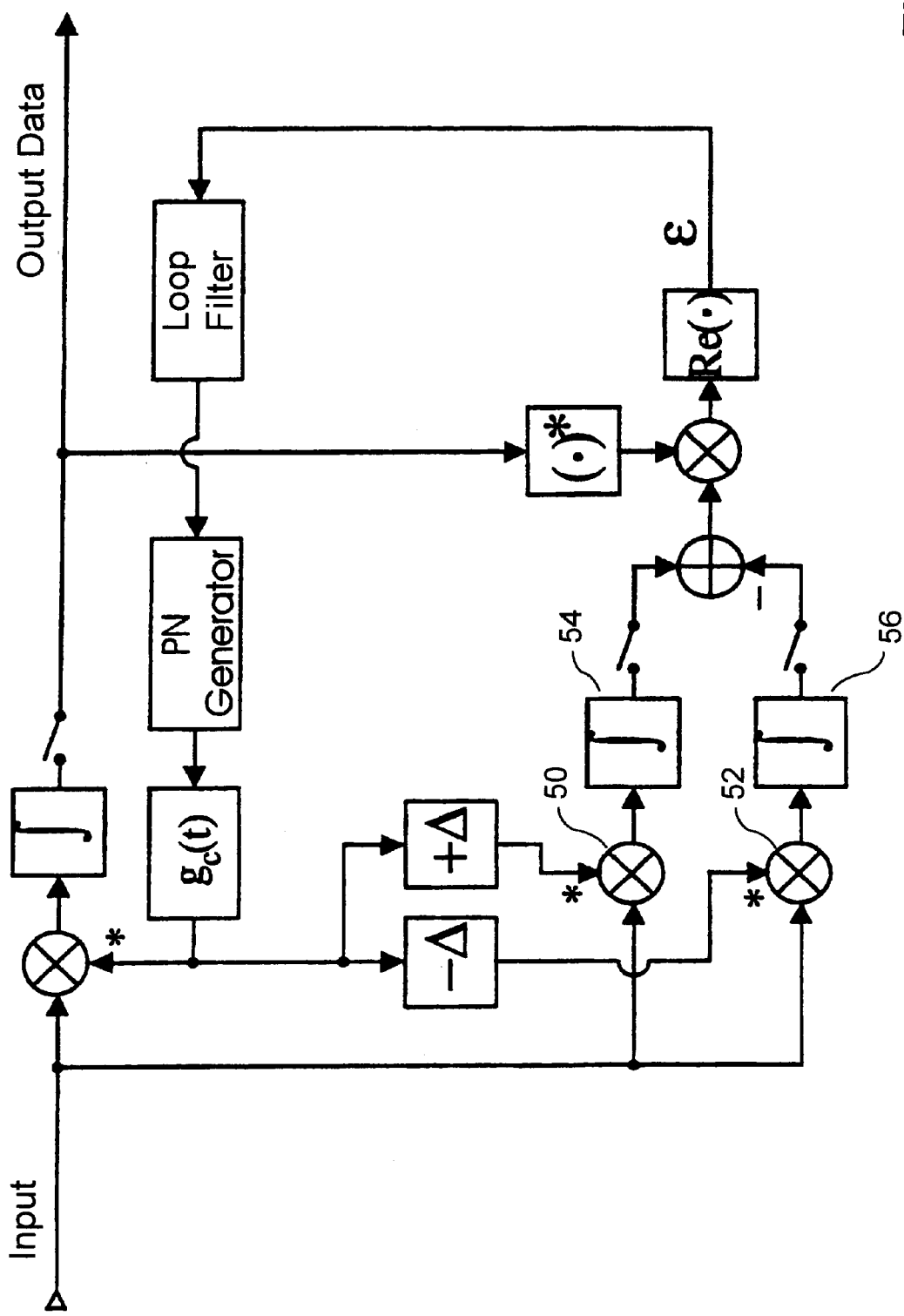
FIG. 8 shows an early-late fine synchronization process that has a correlation with a continuous time spread code.

Alternatively to this, it is possible to carry out the correlation with the continuous time spread code as shown in FIG. 8. The continuous time code is produced by a pulse formation of the chip sequence through filtration with the pulse forming filter. Analogous to FIG. 3, in this instance, the signals are multiplied in mixers 50, 52 in a continuous time fashion and integrated in integrators 54, 56 in accordance with the symbol duration. The integration value is selected in accordance with the symbol duration.

The fine synchronization unit has the possibility of influencing the time offset of each individual RAKE finger. Furthermore, it has information regarding the relative time delays of all of the RAKE fingers.

When the interval of the multipath paths moves into the magnitude of the chip duration, or less, a group of RAKE fingers with close time offset is identified, wherein the interval of the RAKE fingers is the minimal permitted interval in the RAKE receiver. The fine synchronization is then carried out jointly for this group in order to find the optimal time adjustment of the pseudo-noise sequence while maintaining the time offset of the RAKE fingers.

It is first assumed that the minimal permitted interval is the chip duration Tc for which the values ri are uncorrelated and consequently maximal ratio combining can be used for multipath combining. In each instance, in the "timing controller", a control unit assures that during the fine synchronization, the interval between RAKE fingers never falls below the minimal permissible interval. If an initially large interval between two RAKE fingers has been reduced to the minimal interval during the fine synchronization, then the RAKE fingers are grouped and from then on, the fine synchronization is carried out jointly for the group. The total time error signal for a group of L RAKE fingers thereby results from the sum or average of the individual time error signals from all of the RAKE fingers in a group. This total error signal is then conveyed through a common narrowband loop filter and in order to control the relative time offset of the group, is used to influence the time delays of all of the PN generators in the group.

It is also possible to derive the spread codes for all of the RAKE fingers involved in a group from a common PN generator. The apparatus for this case for a group of L RAKE fingers is already shown in FIG. 6.

Figure 9:
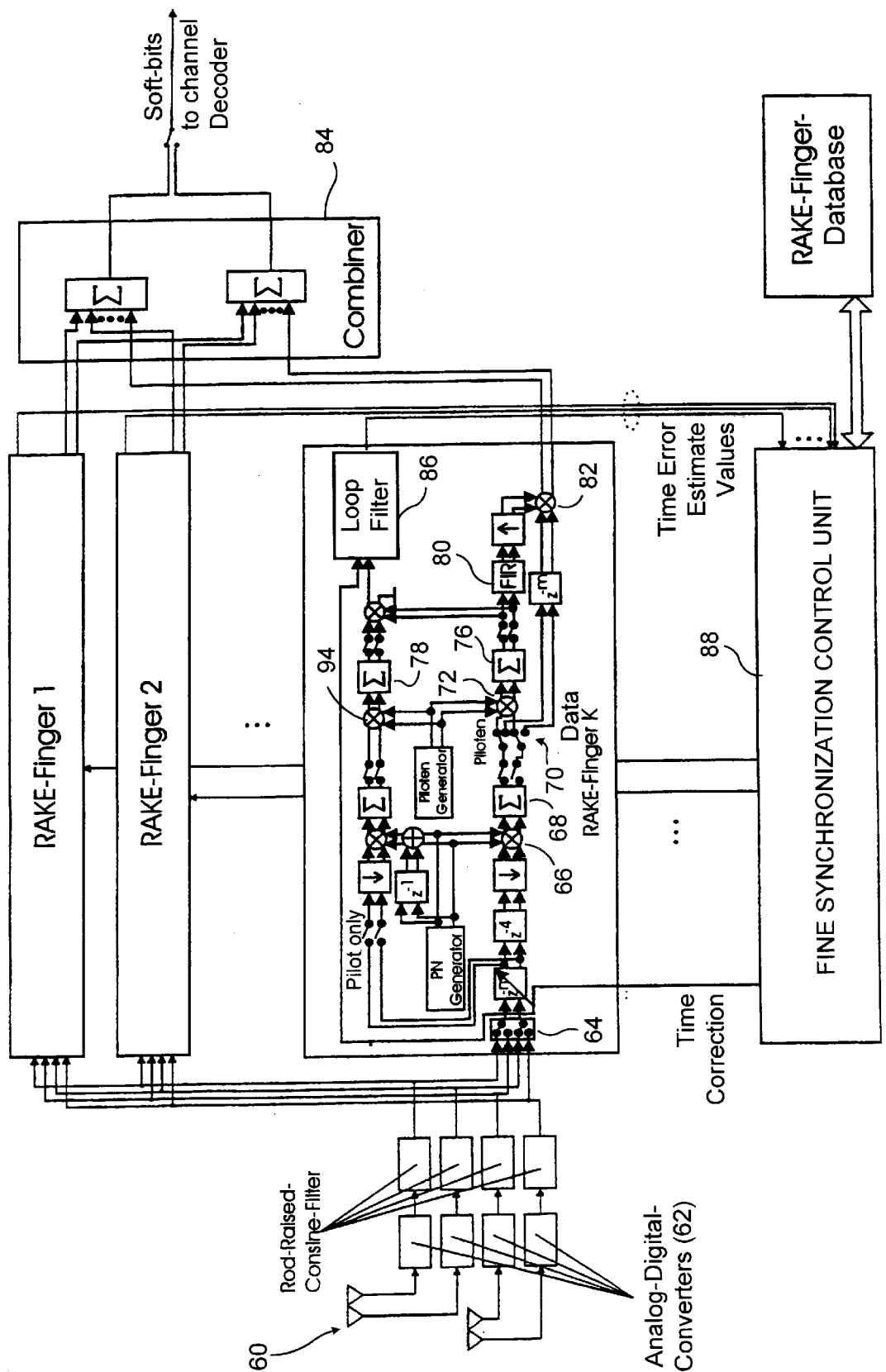
FIG. 9 shows a coherent RAKE receiver based on a pilot sequence, with dual antenna diversity for quadrature phase shift keying (QPSK)

In a second exemplary application, a pilot sequence-based coherent RAKE receiver is used, which is shown in FIG. 9 and has dual diversity antenna 60 for quadrature phase shift keying (QPSK). This RAKE receiver is specifically designed for a coherent spread spectrum process in which periodic pilot symbols are incorporated into the data flow.

Base band signals of two antennas are first scanned and quantized by two IQ demodulators, with the aid of an analog/digital converters (ADC). One ADC respectively handles the in-phase component of the signal and one ADC handles the quadrature component of the signal. The scan rate is eight times the chip rate. Each RAKE finger can, with the aid of an input signal switch 64, be respectively associated with one of the two antennas. The selected input signal is then read into a buffer memory wherein the delay can be freely adjusted in integral scan values.

The values of the on-time signal are then encumbered with an additional delay of four scan values, wherein due to the overscan value of eight, this delay corresponds to exactly half a chip duration. The signal scanned in the chip cycle is now multiplied in mixer 66 by the conjugated complex spread code and the chips belonging to a data symbol are summed in adder 68. The result of the summation for each data symbol is read out and the adder 68 is reset.

A demultiplexer 70 separates the pilot symbols from the information symbols. The pilot symbols received are multiplied in mixers 72, 74 by the conjugated complex locally produced pilot symbols and the sum of the products is calculated in adders 76, 78 for each block of pilot symbols.

The summation results are the on-time estimate values of the pilot symbol correlation. These are then conveyed through an FIR filter 80 for averaging, whose output signals represent the averaged channel amplitude and phase of the RAKE finger.

These estimate values are then multiplied in accordance with the desired number of values. The products of the correspondingly delayed information symbols are multiplied in mixer 82 by the conjugated complexes of the estimate values and supplied to the combiner 84 for multipath combining. In the combiner 84, all of the in-phase estimate values and all of the quadrature estimate values are summated.

Another demultiplexing of the in-phase values and quadrature values is provided by the soft bits, which are produced by the decoding logic.

The fine time synchronization uses only the pilot symbols. To this end, scan values belonging to the pilot symbols are measured immediately after the first delay and are scanned in the chip cycle. These values are then multiplied by the conjugated complex difference between two successive code symbols and the sum of these products is calculated for each pilot symbol. The results are then further multiplied by the conjugated complex locally produced pilot symbols and the sum of the products is calculated for each pilot symbol block.

This value is then further multiplied by the conjugated complex of the on-time estimate value of the block of pilot symbols. The real component of this product is the time error estimate value for the corresponding pilot block. This is then conveyed through the loop filter 86 whose output is transmitted to the control unit 88 for fine synchronization.

The loop filter 86 is comprised of an integrating path and a path that weights the error signal with a proportionality factor. The integrated error signals that is weighted with an additional proportionality factor is added to the direct path arid constitutes the error signal that is transmitted to the control unit for fine synchronization. The loop filter also has an additional input which is also routed to the integrator. This signal can be used to compensate for errors which arise due to the fact that the time delay of the finger can only be adjusted in integral scan values.

The control unit for fine synchronization is informed as to the initial state of the time offsets of the RAKE fingers. The current state of the time offsets is stored in a register set, the RAKE finger database. If the interval between RAKE fingers that belong to one antenna is greater than the minimal permissible interval of eight scan values, then the corresponding RAKE fingers are considered separately. In this instance, the error signals are scaled and rounded and consequently, the correction signals are calculated. If it should turn out that due to the sought-after correction of the time offsets, an impermissible state occurs, i.e. the minimal interval of two RAKE fingers is not met, then the correction signals are adapted in such a way that the interval between chronologically adjacent RAKE fingers of the same antenna is at least eight scan values.

However, if the time interval between chronologically adjacent RAKE fingers of the same antenna is already eight scan values, then the time correction of the offsets for these RAKE fingers is carried out jointly, i.e. the corresponding RAKE fingers are considered as a group. For each group, first the state is calculated, which is produced if the fingers are controlled individually. If the interval of some RAKE fingers would be greater than the minimal interval, then these RAKE fingers are removed from the group and the correction signals are calculated for each finger. For the remaining RAKE fingers or the entire group, the group error signal is calculated by combining, for example, averaging all of the time error signals of the RAKE fingers in the group. The correction signals for the RAKE fingers are produced by scaling the total error signal and rounding to the next scan value. In this instance, the correction values are all equal so that all the RAKE fingers of a group undergo the same correction offset.

If the correction value of one RAKE finger is not equal to zero, then it is supplied with an additional scaling factor to the loop filter as a loop filter correction signal in order to adapt the loop filter to the altered situation. This is necessary because the time regulation in the digital implementation of the RAKE receiver is only possible in discrete steps, namely the time span between two scan values.

It is possible that the values of the error signals of two adjacent RAKE fingers combined into one group can steadily increase in sum, but cancel each other out in the total error signal. If this should be the case, then a compensation can be carried out by the loop filter correction signal through the addition of corresponding compensation values in the integrators of the loop filter, without changing the total error signal.

While there have been described what are believed to be the preferred embodiments of the invention, those skilled in the art will recognize that other and further changes may be made thereto without departing from the invention, and it is intended to claim all such changes and modifications as fall within the scope of the invention.

What is claimed is:

1. A method of operating a spread spectrum receiver having a plurality of RAKE fingers, wherein at least first and second RAKE fingers perform correlation reception of a spread spectrum signal using a conjugated spread code delayed by first and second base time delays to output information signals, and wherein said RAKE fingers generate first and second error signals for correcting said base time delay by developing a correlation difference signal representing the difference between signals received using correlation signals which lead and lag said base time delay, comprising:

correcting said first base time delay using said first error signal and said second base time delay using said second error signal when the difference between said first and second time delay is greater than a minimum value; and combining said first error signal and said second error signal to provide combined error signal, and using said combined error signal to correct said first and second time delays when said difference between said first and second time delays is equal to or less than said minimum value.

2. A method as specified in claim 1 wherein said spread spectrum signal has a chip duration and wherein said minimum value corresponds to said chip duration.

3. A method as specified in claim 1, wherein when said combined error signal is used to correct, a determination is made whether said difference between said first and second time delays would exceed said minimum value if said first and second time delays were corrected by said first and second error signals, and correcting said first and second time delays using said first and second error signals if said difference would exceed said minimum value.

* * * * *